United States Patent
Higgins

[11] Patent Number: 5,932,352
[45] Date of Patent: Aug. 3, 1999

[54] RELEASE FILM

[76] Inventor: David Edward Higgins, Whiteleyside, Commondale, Whitby, North Yorkshire, United Kingdom, YO21 2HJ

[21] Appl. No.: 08/560,762

[22] Filed: Nov. 21, 1995

[51] Int. Cl.[6] .................................................. B41M 5/00
[52] U.S. Cl. ..................... 428/423.1; 428/352; 428/447
[58] Field of Search ............................... 8/471; 428/195, 428/447, 352, 423.1, 500, 913, 914; 503/227

[56] References Cited

U.S. PATENT DOCUMENTS

| | | | |
|---|---|---|---|
| 3,855,052 | 12/1974 | Mestetsky | 161/167 |
| 4,052,495 | 10/1977 | Uhlmann et al. | 264/216 |
| 4,070,526 | 1/1978 | Colquhoun et al. | 428/537 |
| 4,780,512 | 10/1988 | Gould et al. | 525/454 |
| 5,108,782 | 4/1992 | Reed | 427/54.1 |
| 5,212,012 | 5/1993 | Culbertson | 428/336 |
| 5,384,365 | 1/1995 | Hanada et al. | 525/105 |
| 5,415,935 | 5/1995 | Pankratz | 428/352 |
| 5,425,991 | 6/1995 | Lu | 428/352 |
| 5,698,303 | 12/1997 | Caldwell | 428/215 |

FOREIGN PATENT DOCUMENTS

| | | |
|---|---|---|
| 0 323 063 B1 | 7/1989 | European Pat. Off. . |
| 0 342 826 | 11/1989 | European Pat. Off. . |
| 0 349 141 | 1/1990 | European Pat. Off. . |
| 0 400 972 A2 | 12/1990 | European Pat. Off. . |
| 0 416 765 A2 | 3/1991 | European Pat. Off. . |
| 0 536 766 A2 | 4/1993 | European Pat. Off. . |
| 28 32 281 | 1/1980 | Germany . |
| 1 484 816 | 9/1977 | United Kingdom . |
| WO 88/07931 | 10/1988 | WIPO . |
| WO 90 06958 | 6/1990 | WIPO . |

OTHER PUBLICATIONS

Patent Abstracts of Japan vol. 015, No. 284 (C–0851), Jul. 19, 1991 & JP 03 100027 A (Toray Ind Inc), Apr. 25, 1991.
Database WPI Section Ch, Week 8545, Derwent Publications Ltd., London, GB; Class A23, AN 85–280986, XP002026801 and JP 60 192 628 A (Dia Foil KK), Oct. 1, 1985. See Abstract.
Database WPI Section Ch, Week 9311, Derewent Publications Ltd., London, GB; Class A32, AN 93–088392, XP002026802 and JP 05 032 035 A (Oike Kogyo KK), Feb. 9, 1993. See Abstract.
Database WPI Section Ch, Week 9429, Derwent Publications Ltd., London, GB; Class A11, AN 94–239020, XP002026803 and JP 06 172 723 A (Asahi Kasei Kogyo KK), Jun. 21, 1994. See Abstract.
Patent Abstracts of Japan vol. 013, No. 372 (C–627), Aug. 17, 1989 and JP 01 126389 A (Dainichiseika Color & Chem. Mfg. Co. Ltd; Others: 01), May 18, 1989. See Abstract.

*Primary Examiner*—Bruce H. Hess

[57] ABSTRACT

A release film has a polymeric film substrate and a release layer formed from a release composition containing a mixture of a curable silicone resin and a curable polymer. The curable polymer is preferably an ethylenically unsaturated polyurethane resin. The film substrate is preferably polyethylene terephthalate.

3 Claims, 1 Drawing Sheet

RELEASE FILM

This invention relates to a release film and to a method for the production thereof.

Abherents or release agents are generally solid or liquid film-forming materials employed to reduce or prevent adhesion between two surfaces. They are employed in a variety of industrial processes, including metal casting, food preparation and packaging, polymer processing and paper coating, in the production of moulded resin articles, stamping foils and pressure-sensitive adhesive tapes, and in applications such as thermal transfer printing. Typical abherents include natural and synthetic waxes, metal salts of fatty acids, particularly stearic acid, and polymers, such as polyvinylalcohols, polyamides, polyolefins and silicone resins.

A release agent is conveniently employed in association with a polymeric support film. When associated with a support film a release agent must satisfy apparently conflicting criteria, by bonding firmly to the support while providing easy and complete release from an opposing surface. Silicone resins, based on a silicon-oxygen polymer backbone with pendant aliphatic or aromatic carbon side chains, have assumed importance as release agents in recent years, and generally confer good release characteristics. For example EP-323063-A discloses an oriented polymeric film having a release layer of a silicone resin and a volatile inhibitor. EP-342826-A and EP-416765-A describe a release film formed from a self-supporting polymeric film substrate and a polyurethane resin containing polydialkylsiloxane. However, with such prior art release films, the adhesion of the release layer to the film substrate can be inadequate. Furthermore, the release properties achieved are not always sufficient for all applications. Consequently there exists a commercial requirement for improved release films.

The use of silicone resins, when applied to a film substrate during production thereof, is frequently liable to evolve volatile siliceous debris, which not only constitutes a health hazard, possibly necessitating the wearing of dust masks and protective clothing by plant operatives, but also, and importantly, severely contaminates the film production line and renders it unsuitable for the subsequent production of alternative film grades.

It may be necessary to sequentially apply a number of coating layers in order to obtain the required release characteristics. At least one of the aforementioned coating layers is traditionally applied to the film substrate after the production of the film has been completed, ie "off-line", which results in an increase in the number of process steps required to produce the coated film. There is a need to be able to achieve the required release characteristics by a single coating application, preferably during the film making process, ie "in-line", in order to simplify and improve the efficiency of the production process.

We have now devised an improved release film which reduces or substantially overcomes at least one of the aforementioned problems.

Accordingly, the present invention provides a release film comprising a polymeric film substrate having on at least one surface thereof, a release layer formed from a release composition comprising a mixture of a curable silicone resin and a curable polymer.

The invention further provides a method of producing a release film which comprises forming a polymeric film substrate, applying a release composition to at least one surface of the substrate, the release composition comprising a mixture of a curable silicone resin and a curable polymer, and curing the release composition to form a release layer.

The invention also provides a thermal transfer printing receiver sheet comprising a polymeric film substrate having on at least one surface thereof, a dye-receptive receiver layer, and a release layer on the surface of the receiver layer remote from the substrate, the release layer being formed from a release composition comprising a mixture of a curable silicone resin and a curable polymer.

The polymeric film substrate is a film capable of independent existence in the absence of a supporting base.

The substrate to which a release composition is applied to yield a release film according to the invention may be formed from any suitable film-forming, polymeric material. Thermoplastics materials are preferred, and include a homopolymer or copolymer of a 1-olefin, such as ethylene, propylene and but-1-ene, a polyamide, a polycarbonate, more preferably a polyester, and particularly a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyidicarboxylic acid, hexahydro-terephthalic acid or 1,2-bis-p-carboxyphenoxyethane (optionally with a monocarboxylic acid, such as pivalic acid) with one or more glycols, particularly aliphatic glycols, eg ethylene glycol, 1,3- propanediol, 1,4-butanediol, neopentyl glycol and 1,4-cyclohexanedimethanol. A polyethylene terephthalate and/or polyethylene naphthalate film is preferred. A polyethylene terephthalate film is particularly preferred, especially such a film which has been biaxially oriented by sequential stretching in two mutually perpendicular directions, typically at a temperature in the range from 70 to 125° C., and preferably heat set, typically at a temperature in the range from 150 to 250° C., for example as described in GB-A-838708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and US-A-4008203. Blends of these polymers may also be employed. A poly p-phenylene sulphide film is also suitable.

Suitable thermoset resin substrate materials include addition-polymerisation resins, such as acrylics, vinyls, bis-maleimides and unsaturated polyesters, formaldehyde condensate resins such as condensates with urea, melamine or phenols, cyanate resins, isocyanate resins, epoxy resins, functionalised polyesters, polyamides or polyimides.

A film substrate for a release film according to the invention may be unoriented or preferably oriented, for example uniaxially oriented, or more preferably biaxially oriented by drawing in two mutually perpendicular directions in the plane of the film to achieve a satisfactory combination of mechanical and physical properties. Formation of the film may be effected by any process known in the art for producing a polymeric film, for example a tubular or a flat film process.

In a tubular process simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation.

In the preferred flat film process a film-forming polymer is extruded through a slot die and rapidly quenched upon a chilled casting surface (drum) to ensure that the polymer is quenched to the amorphous state. Orientation is then effected by stretching the quenched extrudate in at least one direction at a temperature above the glass transition temperature of the polymer. Sequential orientation may be effected by stretching a flat, quenched extrudate firstly in one direction, usually the longitudinal direction, ie the forward direction through the film stretching machine, and then in the transverse direction. Forward stretching of the extrudate is conventionally effected over a set of rotating rolls or between two pairs of nip rolls, transverse stretching then being effected in a stenter apparatus. Stretching is effected to an extent determined by the nature of the film-forming polymer, for example a polyester is usually stretched so that the dimension of the oriented polyester film is from 2.5 to 4.5 its original dimension in the, or each, direction of stretching.

A stretched film may be, and preferably is, dimensionally stabilised by heat-setting under dimensional restraint at a temperature above the glass transition temperature of the film-forming polymer but below the melting temperature thereof, to induce crystallisation of the polymer.

In one embodiment of the invention the release film is transparent, exhibiting high optical clarity and low haze, preferably having a wide angle haze, being measured according to the standard ASTM D 1003-61, of <8%, more preferably <6%, particularly <5%, and especially <3%, preferably for a 75 µm thick film. The aforementioned optical characteristics can be suitably achieved by having little or no particulate additive present in the substrate. The substrate may contain relatively small quantities of filler material, for example in the range from 5 to 3000 ppm, preferably 50 to 2000 ppm, and more preferably 100 to 1000 ppm. Suitable fillers include inorganic materials such as silica, china clay, calcium carbonate, and organic materials such as silicone resin particles. Spherical monodisperse fillers are preferred. The substrate may contain filler due to the normal practice of using reclaimed film in the film manufacturing process.

However, in an alternative embodiment of the invention the release film is opaque, which is defined as a film exhibiting a Transmission Optical Density (Sakura Densitometer; type PDA 65; transmission mode) of from 0.75 to 1.75, and particularly of from 1.2 to 1.5, preferably for a 150 µm thick film. The release film is conveniently rendered opaque by incorporating into the synthetic polymer of the substrate layer, an effective amount of an opacifying agent. However, in a preferred embodiment of the invention the opaque substrate layer is voided, ie comprises a cellular structure containing at least a proportion of discrete, closed cells. It is therefore preferred to incorporate into the substrate polymer an effective amount of an agent which is capable of generating an opaque, voided substrate layer structure. Suitable voiding agents, which also confer opacity, include an incompatible resin filler, a particulate inorganic filler or a mixture of two or more such fillers.

By an "incompatible resin" is meant a resin which either does not melt, or which is substantially immiscible with the substrate polymer, at the highest temperature encountered during extrusion and fabrication of the layer. Such resins include polyamides and olefin polymers, particularly a homo- or co-polymer of a mono-alpha-olefin containing up to 6 carbon atoms in its molecule, for incorporation into polyester films, or polyesters of the kind hereinbefore described for incorporation into polyolefin films.

Particulate inorganic fillers suitable for generating an opaque, voided substrate layer include conventional inorganic pigments and fillers, and particularly metal or metalloid oxides, such as alumina, silica and titania, and alkaline metal salts, such as the carbonates and sulphates of calcium and barium. Barium sulphate is a particularly preferred filler which also functions as a voiding agent.

Non-voiding particulate inorganic fillers may also be added to the film-forming polymeric substrate layer.

Suitable voiding and/or non-voiding fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the substrate polymer.

Production of a substrate layer having satisfactory degrees of opacity and preferably voiding requires that the filler should be finely-divided, and the average particle size thereof is preferably in the range from 0.1 to 10 µm, more preferably 0.15 to 3 µm, and particularly 0.2 to 0.75 µm.

Incorporation of the opacifying/voiding agent into the substrate layer polymer may be effected by conventional techniques, for example by mixing with the monomeric reactants from which the polymer is derived, by dry blending with the polymer in granular or chip form prior to formation of a film therefrom, or by using masterbatching technology.

The amount of filler, particularly of barium sulphate, incorporated into the substrate layer polymer is preferably in the range from 5 to 50 weight %, relative to the weight of the polymer. Particularly satisfactory levels of opacity and gloss are achieved when the concentration of filler is in the range from 8 to 30, more preferably 15 to 20 weight %, relative to the weight of the substrate layer polymer.

The curable silicone resin component of the release composition preferably comprises polysiloxane, more preferably polydialkylsiloxane, and may be, for example a silanol and/or hydrogen terminated and/or in-chain polydialkylsiloxane, preferably terminated polydimethylsiloxane, or an organomodified siloxane comprising a terminal functional group such as a reactive vinyl, hexenyl, hydrogen, and/or hydroxyl group.

Cross-linking of the silicone resin may be initiated by the use of a catalyst, heat, UV radiation and/or electron beam radiation. Cross-linking of the silicone resin may occur by the condensation cure reaction between Si—OH and Si—H groups, preferably in the presence of an organotin or organozinc catalyst, or in the preferred route, by the addition cure reaction between Si-vinyl (ie —CH=CH) and Si—H groups, preferably in the presence of a platinum complex catalyst. The aforementioned different reactive groups may be present on the same silicone chain, prior to cross-linking, ie the cross-linking reaction involves both intra- and inter-chain silicone reactions. In a preferred embodiment of the invention the different reactive groups are present on different silicone chains, ie the crosslinking reaction primarily involves inter-chain silicone reactions. In a particularly preferred embodiment of the invention, the release composition comprises a relatively high molecular weight silicone, preferably polydimethylsiloxane, polymer containing vinyl groups, preferably of 50 to 800, more preferably 80 to 400, and particularly 100 to 200 monomer units; and a relatively low molecular weight Si—H containing silicone polymer, preferably of 5 to 40, more preferably 5 to 30, and particularly 5 to 20 monomer units. The ratio of high to low molecular weight silicone polymers present in the release composition is preferably such that the ratio of vinyl groups to Si—H groups is in the range from 0.2 to 5:1, more preferably 0.4 to 2.5:1, and particularly 0.6 to 1.5:1.

The amount of curable silicone resin present in the release composition is preferably in the range from 20 to 95, more preferably 50 to 90, and particularly 80 to 90 weight %, relative to the total solids of the composition.

The curable polymer component of the release composition comprises at least one monomer which, in the polymerised state, comprises at least one functional group capable of cross-linking with itself and/or with a functional group on one or more other monomers present in the polymer and/or with the silicone resin. The curable silicone resin and curable polymer are cured in the presence of one another, preferably resulting in intermolecular cross-links being formed between the silicone resin and the polymer. The use of the word "polymer" is intended to cover materials which may be regarded as oligomers, which only form "true" polymers when cured. The molecular weight of the curable polymer is preferably in the range from 4,000 to 100,000, more preferably 5,000 to 50,000, and particularly 6,000 to 20,000.

The chemical composition of the curable polymer may vary over a wide range, with the proviso that the polymer contains the aforementioned required cross-linking ability. Thus, the polymer may, for example, be an acrylic and/or methacrylic polymer, epoxy-acrylate resin, unsaturated or functionalised polyester, unsaturated polyolefin, polyurethane, styrene polymer, butadiene polymer, and/or a copolymer, either graft, random or block of any two or more of the aforementioned polymers. The curable polymer may contain, as a minor proportion thereof, polysiloxane segments, more preferably polydialkylsiloxane, more preferably comprising Si—OH, Si-vinyl and/or Si—H groups, which are capable of crosslinking with the curable silicone resin component of the release composition. The polysiloxane segments may be in-chain and/or pendant. The amount of polysiloxane present in the polymer is preferably in the range from 0 to 45, more preferably 1 to 40, particularly 3 to 30, and especially 5 to 20 weight %. Mixtures of any of the aforementioned polymers or copolymers may also be employed.

Suitable acrylic or methacrylic monomers having cross-linking functional groups include monomers containing carboxyl groups, such as acrylic acid, methacrylic acid, itaconic acid and crotonic acid; anhydrides such as maleic anhydride and itaconic anhydride, epoxy containing monomers such as glycidyl acrylate, glycidyl methacrylate and allyl glycidyl ether; monomers containing amine groups such as acrylamide, methacrylamide, N-methylol acrylamide and N-methylol methacrylamide; and monomers containing hydroxyl groups such as hydroxyethyl acrylate or methacrylate and hydroxypropyl acrylate or methacrylate.

Other suitable cross-linking monomers include sulpho derivatives of dicarboxylic acids such as sulphoterephthalic acid or sulphoisoterephthalic add; tri- or tetra-carboxylic acids, or the anhydrides or lower alkyl esters thereof, such as trimellitic acid, pyromellitic add, trimesic acid and benzo phenone tetra carboxylic acid; and dienes such as butadiene and pentadiene.

More than one of the aforementioned cross-linking monomers may be present in the curable polymer.

In a preferred embodiment of the invention the curable polymer comprises an ethylenically unsaturated monomer, more preferably a monomer comprising a vinyl group. Suitable materials include functionalised polyolefins such as maleinised polybutadiene, polybutadiene and butadiene copolymers such as styrene/butadiene copolymers, unsaturated polyesters, epoxy-acrylate resins, and unsaturated polyurethanes.

In a particularly preferred embodiment of the invention the curable polymer comprises a functionalised polyurethane resin, preferably a polyurethane comprising an ethylenically unsaturated monomer. The polyurethane resin is preferably the reaction product of, inter alia, an organic polyisocyanate, a polymeric polyol and a functional group, preferably an ethylenically unsaturated group, containing monomer. The monomer preferably still comprises the ethylenically unsaturated group in the polymerised state.

The organic polyisocyanate component of the polyurethane resin may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4-4'-dicyclohexylmethane diisocyanate, p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates may be used and also polyisocyanates which have been modified by the introduction of urethane, allophanate, urea, biuret, carbodiimide, uretonimine or isocyanurate residues.

The polymeric polyol component of the polyurethane resin may be a member of any of the chemical classes of polymeric polyols used or proposed to be used in polyurethane formulations. For example, the polymeric polyol may be a polyester, polyesteramide, polyether, polythioether, polyacetal, polyolefin, or polycarbonate. A polyester, particularly an aromatic polyester, is preferred. The molecular weight of the polymeric polyol is preferably in the range from 700 to 3000.

The monomer containing a functional group component of the polyurethane resin is preferably an ethylenically unsaturated monomer, more preferably an acrylate monomer such as a hydroxyalkyl acrylate and/or methacrylate, eg 2-hydroxyethyl and/or 2-hydroxypropyl acrylate and/or methacrylate; or particularly an epoxy-containing acrylate such as glycidyl acrylate, glycidyl methacrylate and/or allyl glycidyl ether.

If desired, a catalyst for urethane formation, such as dibutyltin dilaurate and/or stannous octoate may be used to assist formation of the polyurethane resin, and a non-reactive solvent may be added before or after formation of the medium to control viscosity. Suitable non-reactive solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone.

A polyfunctional active hydrogen-containing chain extender may be employed, is preferably water-soluble, and water itself may be effective. Other suitable extenders include a polyol, an amino alcohol, ammonia, a carboxylic acid, a primary or secondary aliphatic, alicyclic, aromatic, araliphatic or heterocyclic amine especially a diamine, hydrazine or a substituted hydrazine.

Examples of suitable chain extenders useful herein include dimethylolpropionic acid, ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris (2-aminoethyl) amine, 3,3'-dinitrobenzidine, 4,4'-methylenebis(2-chloroaniline), 3,3'-dichloro4,4'-bi-phenyl diamine, 2,6-diaminopyridine, 4,4'-diaminodiphenylmethane, methane diamine, m-xylene diamine, isophorone diamine, and adducts of diethylene triamine with acrylate or its hydrolysed products. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic adds and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazines such as gamma-hydroxylbutyric hydrazide, bis-semi-carbazide, bis-hydrazide carbonic esters of glycols such as any of the glycols mentioned above.

Where the chain extender is other than water, for example a carboxylic acid, diamine or hydrazine, it may be added to the aqueous dispersion of polyurethane resin or, alternatively, it may already be present in the aqueous medium when the resin is dispersed therein.

The amount of curable polymer present in the release composition is preferably in the range from 5 to 80, more preferably 10 to 50, and particularly 10 to 20 weight %, relative to the total solids of the composition.

The ratio of curable silicone resin to curable polymer present in the release composition, and consequently in the release layer, is preferably in the range from 0.25 to 20:1, more preferably 2 to 10:1, and particularly 4 to 7:1 by weight.

In a preferred embodiment of the invention, the release composition additionally comprises a, preferably low molecular weight, more preferably non-silicone containing, cross-linking agent. The cross-linking agent is suitably an organic material, preferably a monomeric and/or oligomeric species, and particularly monomeric, prior to formation of the release layer. The molecular weight of the cross-linking agent is preferably less than 2000, more preferably less than 1500, especially less than 1000, and particularly in the range from 250 to 500. Suitable cross-linking agents may comprise alkyd resins, amine derivatives such as hexamethoxymethyl melamine, and/or condensation products of an amine, eg melamine, diazine, urea, cyclic ethylene urea, cyclic propylene urea, thiourea, cyclic ethylene thiourea, aziridines, alkyl melamines, aryl melamines, benzo guanamines, guanamines, alkyl guanamines and aryl guanamines, with an aldehyde, eg formaldehyde. A preferred cross-linking agent is the condensation product of melamine with formaldehyde. The condensation product may optionally be alkoxylated. A catalyst is also preferably employed to facilitate cross-linking action of the cross-linking agent. Preferred catalysts for cross-linking melamine formaldehyde include ammonium chloride, ammonium nitrate, ammonium thiocyanate, ammonium dihydrogen phosphate, diammonium hydrogen phosphate, para toluene sulphonic acid, sulphuric acid, maleic acid stabilised by reaction with a base, ammonium para toluene sulphonate and morpholinium para toluene sulphonate.

The cross-linking agent preferably exhibits at least tri-functionality (ie three functional groups) to promote intermolecular cross-linking with the functional groups present in the curable silicone resin and/or curable polymer, and to improve adhesion of the release layer to the surface of the underlying layer.

The amount of cross-linking agent present in the release composition is preferably in the range from 0.1 to 25, more preferably 0.15 to 10, particularly 0.2 to 5, and especially 0.25 to 2 weight %, relative to the total solids of the composition.

If desired, the release composition may additionally comprise a surfactant to promote spreading thereof when applied to a film substrate.

The release composition, preferably in the form of an aqueous dispersion, may be applied to the substrate film surface by conventional coating techniques. The applied medium, generally having a solids content in the range from 1 to 20, preferably 2 to 10, and particularly 5 to 7 weight %, is subsequently dried to remove the dispersant and also to effect cross-linking of the layer. Drying may be effected by conventional techniques, for example by passing the coated film through a hot air oven. Drying may be effected during normal post-formation film-treatments, such as heat-setting.

The release composition may be applied to an already oriented film substrate. However, application of the coating medium is preferably effected before or during any stretching operation. In particular, it is preferred according to this invention that the release composition should be applied to the film between the two stages (longitudinal and transverse) of a biaxial stretching operation. Such a sequence of stretching and coating is especially preferred for the production of linear polyester release films, such as polyethylene terephthalate films, which are preferably firstly stretched in the longitudinal direction over a series of rotating rollers, coated with the release composition and then stretched transversely in a stenter oven, preferably followed by heat-setting.

The reverse surface, remote from the release layer, of a release film according to the invention may be untreated or may have thereon a functional layer, such as a priming medium, a sealable medium or, an antistatic layer.

The release films of the invention may conveniently contain any of the agents conventionally employed in the manufacture of polymeric films. Thus, agents such as dyes, pigments, lubricants, anti-oxidants, antistatic agents, surface active agents, gloss-improvers, prodegradants, fire-retardants, and ultra-violet light stabilisers may be incorporated in the substrate and/or release layer, as appropriate.

The release films may vary in thickness depending on the intended application, but release films preferably have a total thickness in the range from 5 to 350, more preferably 10 to 200 $\mu$m, and particularly 50 to 150 $\mu$m. The dry thickness of the release layer is desirably within a range of from 0.01 to 10, preferably 0.02 to 1.0 $\mu$m.

The release layers provided by the invention have excellent adherence to the underlying layer, low coefficients of friction, good wear resistance, and offer effective release from adhesives.

Release films according to the invention are of general applicability and may be employed, inter alia, in the production of moulded articles from curable resins, as release tapes, for example for asphalt roofing materials, and particularly as a thermal transfer printing (TTP) donor, or preferably receiver, sheet.

A TTP receiver sheet comprises a polymeric substrate, a dye-receptive receiver layer and a release layer as described herein. The polymeric substrate is preferably an oriented polyester, more preferably polyethylene terephthalate. The TTP substrate may be transparent or preferably opaque, particularly voided, as described herein.

Suitable dye-receptive receiver layers are well known in the art, and include polyester resins, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Typical copolyesters which provide satisfactory dye-receptivity are those of ethylene terephthalate and ethylene isophthalate, especially in the molar ratios of from 50 to 90 mole % ethylene terephthalate and correspondingly from 50 to 10 mole % ethylene isophthalate. Preferred copolyesters comprise from 65 to 85 mole % ethylene terephthalate and from 35 to 15 mole % ethylene isophthalate especially a copolyester of about 82 mole % ethylene terephthalate and about 18 mole % ethylene isophthalate.

Formation of a receiver layer on the substrate layer may be effected by conventional techniques, for example by casting the receiver layer polymer onto a preformed substrate layer. Conveniently however, formation of a composite sheet (substrate and receiver layer) is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without Intermixing thereby to produce a composite sheet.

The release composition is preferably coated on the surface of the receiver layer remote from the substrate in order to form a TTP receiver sheet exhibiting excellent release properties.

The invention is illustrated by reference to the accompanying drawings in which.

Figure 1:
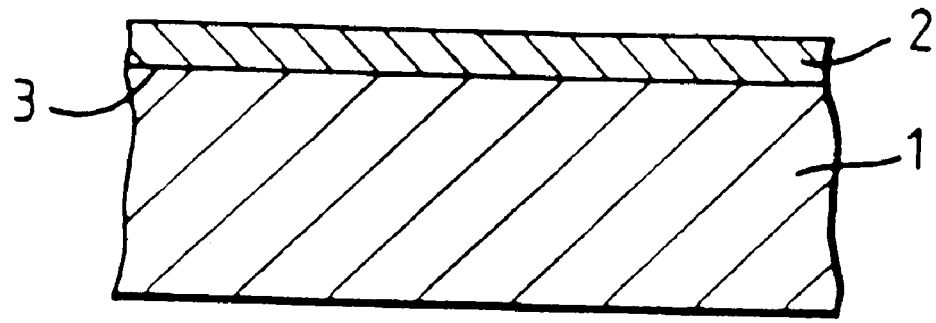
FIG. 1 is a schematic sectional elevation, not to scale, of a polymeric film having a single release layer bonded to a substrate layer.

Referring to FIG. 1 of the drawings, the film comprises a polymeric substrate layer (1) having a release layer (2) bonded to one surface (3) of the substrate.

Figure 2:
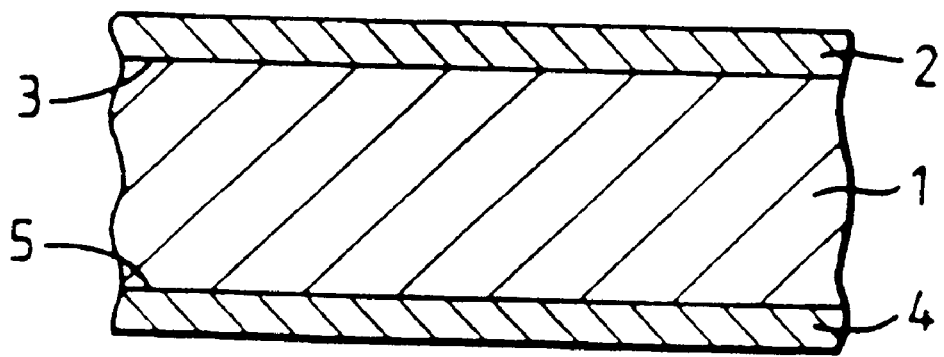
FIG. 2 is a similar schematic elevation of a polymeric film having both surfaces of the substrate coated with a release layer.

The film of FIG. 2 additionally comprises a second release layer (4) bonded to the second surface (5) of the substrate.

The invention is further illustrated by reference to the following examples.

EXAMPLE 1

A molten web of polyethylene terephthalate was extruded in a conventional manner from a slot die on to the polished surface of a cooled rotating drum upon which the web was quenched to below the glass transition temperature of the polymer to provide an amorphous film. The quenched film was then reheated and drawn about 3.5 times its original length in the longitudinal direction at a temperature of about 80° C. The monoaxially oriented polyethylene terephthalate substrate film was coated on one side with a release layer coating composition comprising the following ingredients:

| | |
|---|---|
| Syloff 7198 (40% w/w aqueous dispersion of high molecular weight silicone polymer containing Si-vinyl groups, and low molecular weight silicone polymer containing Si-H groups, supplied by Dow Corning) | 200 ml |
| Syloff 7199 (40% w/w aqueous dispersion of high molecular weight silicone polymer containing Si-vinyl groups, and platinum complex catalyst, supplied by Dow Corning) | 100 ml |
| Neorad R-440 (40% w/w aqueous dispersion of polyurethane acrylate, supplied by Zeneca Resins) | 50 ml |
| Cymel 350 (10% w/w aqueous solution of melamine formaldehyde) | 5 ml |
| Ammonium p toluene sulphonate (10% w/w aqueous solution) | 0.5 ml |
| Synperonic NP10 (10% w/w aqueous solution of nonyl phenol ethoxylate, supplied by ICI) | 55 ml |
| Demineralised water | 2090 ml |

The coated film was passed into a stenter oven, where the film was stretched in the sideways direction to approximately 3.5 times its original dimensions. The coated biaxially stretched film was heat set at a temperature of about 220° C. by conventional means. Final film thickness was 75 $\mu$m. The dry coat weight of the release layer was approximately 0.8 mgdm-$^{-2}$, and the thickness of the release layer was approximately 0.08 $\mu$m. The atmosphere from various parts of the stenter oven was pumped for one hour through tubes of "Tenax-TA" (AKZO) absorbent resin, which was analysed by thermal desorption mass spectrometry. No significant amounts of volatile silicone materials were detected.

"Permacel J-LAR" adhesive tape was pressed, by using a thumb, on to the surface of the release layer using uniform pressure. The degree of release was measured by peeling apart each sample using an 'Instron' A0533 Tensometer at a peel speed of 200 mm min$^{-1}$. The peeled off adhesive tape was then pressed on to a new sheet of uncoated polyethylene terephthalate film and the degree of release measured again. Low release values in the second release (or transfer) test is an indication of unwanted loss of the release layer from the release film to the adhesive tape during the first release test.

The results are given in Table 1.

EXAMPLE 2

This is a comparative Example not according to the invention.

The procedure of Example 1 was repeated except that the polyethylene terephthalate film was not coated with a release composition. The results are given in Table 1.

EXAMPLE 3

This is a comparative Example not according to the invention.

The procedure of Example I was repeated except that the release composition contained no Neorad R-440. The overall solids content of the release composition was maintained. The results are given in Table 1.

EXAMPLE 4

This is a comparative Example not according to the invention.

The procedure of Example 1 was repeated except that the release composition contained no Syloff 7198 or 7199. The overall solids content of the release composition was maintained. The results are given in Table 1.

TABLE 1

| | Peel Strength (g/25 mm (Nm-1)) | |
| --- | --- | --- |
| Example | Release Test | Transfer Test |
| 1 | 5 (2) | 605 (237) |
| 2 (comparative) | 610 (240) | 600 (235) |
| 3 (comparative) | 5 (2) | 10 (4) |
| 4 (comparative) | 550 (215) | 500 (195) |

The results illustrate that the release layer according to the present invention provides excellent release properties without any significant transfer of the release layer.

I claim:

1. A release film comprising a polymeric film substrate having on at least one surface thereof a release layer formed from a release composition comprising a mixture of a curable silicone resin comprising a vinyl containing silicone polymer with 80 to 400 vinyl groups and an Si—H containing polymer with 5 to 30 monomer units wherein the ratio of vinyl groups to Si—H groups is in a range of 0.4 to 2.5:1 and a curable polyurethane resin comprising at least one ethylenically unsaturated group.

2. The release film of claim 1 wherein the ratio is 0.6 to 1.5:1.

3. The release film of claim 2 wherein the curable silicone present is present in range of 50 to 90 weight percent based on the total solids of the release composition.

* * * * *